May 29, 1923.
C. O. YOUNG
PROCESS OF MAKING CHLORHYDRINS
Filed May 5, 1922
1,456,959
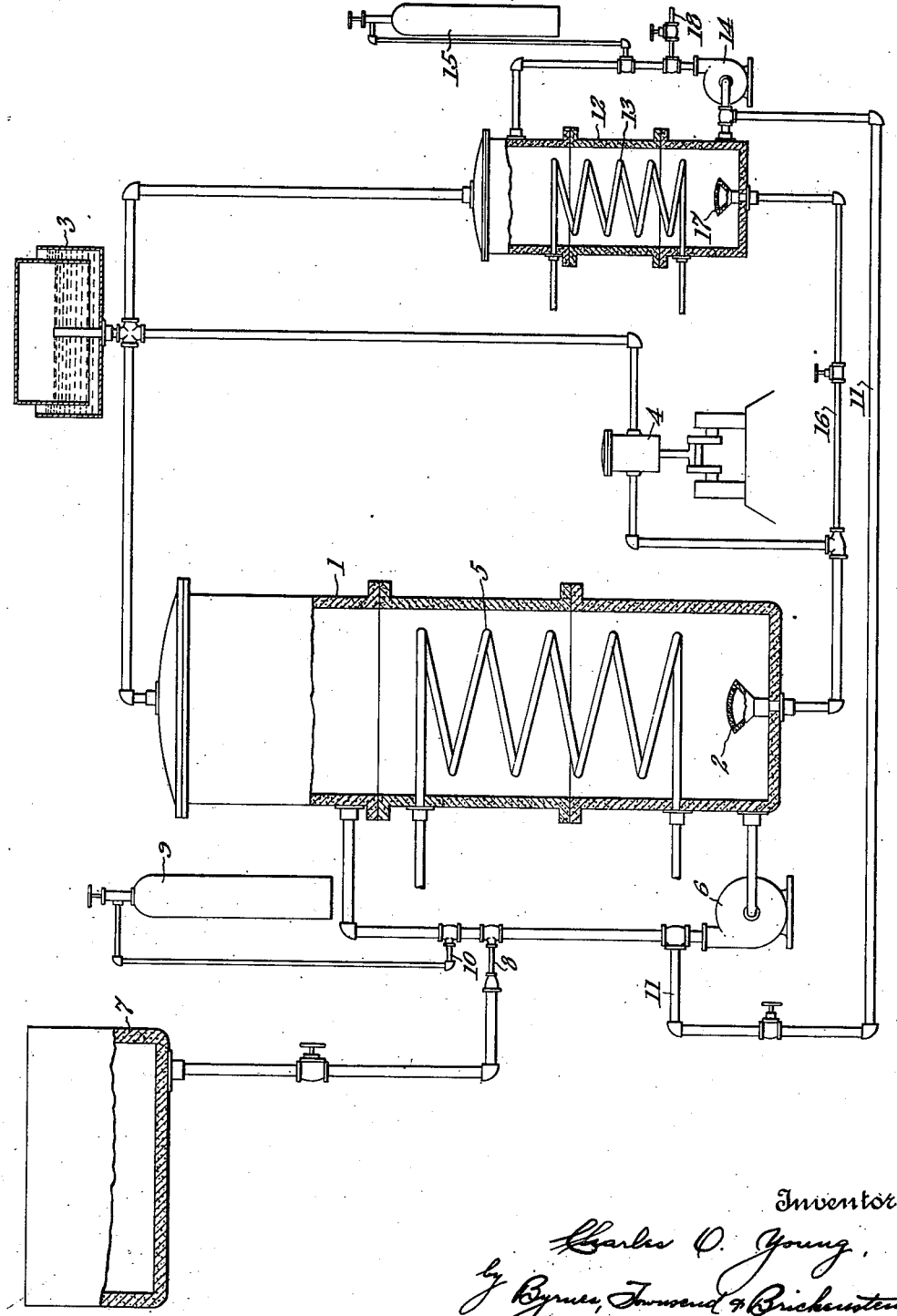

Patented May 29, 1923.

1,456,959

UNITED STATES PATENT OFFICE.

CHARLES O. YOUNG, OF ELMHURST, NEW YORK, ASSIGNOR TO CARBIDE & CARBON CHEMICALS CORPORATION, A CORPORATION OF NEW YORK.

PROCESS OF MAKING CHLORHYDRINS.

Application filed May 5, 1922. Serial No. 558,830.

*To all whom it may concern:*

Be it known that I, CHARLES O. YOUNG, a citizen of the United States, residing at Elmhurst, in the county of Queens and State of New York, have invented certain new and useful Improvements in Processes of Making Chlorhydrins, of which the following is a specification.

This invention relates to the manufacture of chlorhydrins of hydrocarbons having an olefine linkage, the object of the invention being the provision of a simple process for the manufacture of these products with a high operating efficiency and a minimum production of objectionable by-products.

In a copending application filed of even date herewith, Serial No. 560,391 by the present applicant and George O. Curme, jr., there is described a process for the manufacture of chlorhydrins wherein a solution of hypochlorite, such as sodium hypochlorite, free from iron, is treated with a suitable decomposing agent in such manner that only a part of the contained hypochlorite is decomposed into hypochlorous acid, so that a solution containing both hypochlorous acid and a hypochlorite is produced. This solution, preferably refrigerated, is then contacted with olefine, whereupon the free hypochlorous acid combines with the olefine to form the corresponding chlorhydrin. The residual hypochlorite may be utilized to produce a further portion of hypochlorous acid, which is converted into chlorhydrin as before.

In the application referred to, I have mentioned the desirability of diluting the liquor with which the olefine is to be contacted with a previously formed solution of chlorhydrin, in order that the concentration of hypochlorous acid may be kept low in the reacting mixture and the production of very dilute chlorhydrin solutions such as would result from the treatment of very dilute hypochlorous acid solutions free from chlorhydrin, may be avoided.

Further investigations have proved the advantages of this method of operation and have established the fact that the best results are obtained when the hypochlorous acid solution passing to the zone wherein the chlorhydrin is to be formed is very dilute indeed. This high dilution may be advantageously brought about by the circulation described in our prior application, the liquor being passed through a reaction zone wherein the hypochlorous acid in the liquid is caused to combine with olefine, more hypochlorous acid being added to the exit liquor, or a portion of it, and the liquor containing the hypochlorous acid being returned to the reaction zone. The novelty of the present invention resides in so adjusting the proportions of chlorhydrin solution and added hypochlorous acid that the concentration of the latter in the liquor passing to the reaction zone shall be very slight, as more fully hereinafter described.

For a full understanding of the present invention, reference is made to the accompanying drawing wherein the figure is a diagrammatic representation of a preferred form of apparatus for carrying the invention into effect. In the drawing, 1 is a reaction tower into which the olefine is introduced through a diffusor 2, the tower being filled to a suitable height with liquor containing a small percentage of hypochlorous acid. The olefine, originally stored in gas-holder 3, is pumped by compressor 4 to the diffusor 2, the unabsorbed olefine passing out the top of the column and being returned to the suction side of the compressor and olefine from the gas-holder, replenishing the system as gas is absorbed.

The liquor which is kept cold by brine coil 5 is likewise circulated, as by centrifugal pump 6 being withdrawn from the lower part of the tower and introduced into its upper part. A small stream of hypochlorite solution from the tank 7 is continuously introduced into the circulation at 8, while a stream of chlorine which is not quite sufficient to decompose all the hypochlorite added is supplied by cylinder 9 and is introduced into the circulation at 10.

Liquor is continuously withdrawn from the circulation through pipe 11, and is circulated through a reaction tower 12 which is similar to tower 1, but preferably considerably smaller. Tower 12 is likewise provided with a brine-coil, shown at 13 and with a centrifugal pump 14 to maintain the liquor-circulation. In this second reaction tower, the residual hypochlorite is decomposed by chlorine from tank 15 or by any other suitable decomposing agent.

The olefine required to combine with the hypochlorous acid thus formed is supplied through pipe 16 and diffusor 17, the excess being drawn off at the top of the tower and returned to compressor 4.

Liquor from the circulation of tower 12 is continuously withdrawn through pipe 18 for concentration of the chlorhydrin, but a body of liquor of considerable depth is maintained in tower 12.

When making ethylene chlorhydrin, the hypochlorite solution, which may contain 5–7% NaOCl as in said prior application, is preferably mixed with the liquor withdrawn from tower 1 in the proportion of one part of hypochlorite solution to 80 to 250 parts of recirculated liquor. Chlorine is introduced at a rate sufficient to decompose 50% to 80% of the hypochlorite added. Under these conditions, the liquor entering tower 1 will contain hypochlorous acid in the amount of 0.015% to 0.09%. A hypochlorous acid concentration of 0.03% has given excellent results.

In the tower 12, a complete clean-up of the residual hypochlorite may be effected. The quantity of hypochlorite present is so minute that a very little chlorine will suffice to decompose it, and in some instances, where the hypochlorite solution used contained carbonate, all the hypochlorite became decomposed in the second reaction tower without the addition of chlorine. Any excess of chlorine in the first reaction tower where the bulk of the chlorhydrin is formed, promotes the formation of undesirable by-products.

While the process has been described in connection with a particular order of bringing together the preformed chlorhydrin solution, the hypochlorite solution, the decomposing agent and the olefine, it will be apparent that many modifications of this order are possible, and the invention is limited only by the appended claims.

The term "olefine" is used in the description and claims to designate compounds having an olefine linkage, for example the simple olefines of the ethylene series, the diolefines, and the various substituted olefines. The procedure described herein is applicable generally to hydrocarbons having an olefine linkage, whether or not these hydrocarbons are gaseous at usual temperatures.

I claim:

1. Process of making chlorhydrins from olefines, comprising reacting with the hydrocarbon upon a solution containing free hypochlorous acid in amount not exceeding 0.09% and a hypochlorite, thereby preparing chlorhydrin substantially free from ethylene or propylene chloride; setting free hypochlorous acid from the residual hypochlorite; and reacting thereon with a further quantity of hydrocarbon.

2. In a process of making chlorhydrins from olefines, the step which consists in bringing the hydrocarbon into reactive contact with a solution containing free hypochlorous acid in amount not exceeding 0.09% and a hypochlorite.

3. In a process of making chlorhydrins from olefines, the step which consists in bringing the hydrocarbon into reactive contact with a solution containing free hypochlorous acid in amount not exceeding 0.09% and a hypochlorite, while maintaining said solution at a temperature below normal.

4. In a process of making chlorhydrins from olefines, the step which consists in bringing the hydrocarbon into reactive contact with a solution containing free hypochlorous acid in amount not exceeding 0.09% and a hypochlorite, while maintaining said solution at a temperature not in excess of 10° C.

5. In a process of making chlorhydrins from olefines, the steps which consist in bringing the hydrocarbon into reactive contact with a solution containing free hypochlorous acid in amount not exceeding 0.09% and a hypochlorite; withdrawing the solution containing the residual hypochlorite from contact with the hydrocarbon, and setting free hypochlorous acid therein; and reacting thereon with a further quantity of the hydrocarbon.

6. In a process of making chlorhydrins from olefines, the step which consists in diluting a hypochlorite solution with a solution containing chlorhydrin; setting free hypochlorous acid in amount not exceeding 0.09% in the resulting mixed solution; and reacting thereon with the hydrocarbon to increase the chlorhydrin concentration.

In testimony whereof, I affix my signature.

CHARLES O. YOUNG.